US012770154B2

(12) United States Patent
Yaksh et al.

(10) Patent No.: US 12,770,154 B2
(45) Date of Patent: Oct. 20, 2026

(54) AUTOMATION OF FRAUD DETECTION WITH MACHINE LEARNING UTILIZING PUBLICLY AVAILABLE FORMS

(71) Applicant: Bank of America Corporation, Charlotte, NC (US)

(72) Inventors: Rahul Yaksh, Austin, TX (US); Amer Ali, Jersey City, NJ (US); Brian Jacobson, Los Angeles, CA (US); Elvis Nyamwange, Little Elm, TX (US); Erik Dahl, Newark, DE (US); Hari Vuppala, Charlotte, NC (US); Pratap Dande, Saint Johns, FL (US); Rahul Phadnis, Charlotte, NC (US); Sailesh Vezzu, Hillsborough, NJ (US)

(73) Assignee: Bank of America Corporation, Charlotte, NC (US)

( * ) Notice: Subject to any disclaimer, the term of this patent is extended or adjusted under 35 U.S.C. 154(b) by 279 days.

(21) Appl. No.: 18/234,911

(22) Filed: Aug. 17, 2023

(65) Prior Publication Data

US 2025/0061469 A1 Feb. 20, 2025

(51) Int. Cl.
*G06Q 30/018* (2023.01)
*G06V 30/412* (2022.01)

(52) U.S. Cl.
CPC ....... *G06Q 30/0185* (2013.01); *G06V 30/412* (2022.01)

(58) Field of Classification Search
CPC ......................... G06Q 30/0185; G06V 30/412
See application file for complete search history.

(56) References Cited

U.S. PATENT DOCUMENTS

| | | | | |
|---|---|---|---|---|
| 11,216,895 | B1 * | 1/2022 | Schwartz | G06F 16/248 |
| 2013/0325747 | A1 * | 12/2013 | Lee | G06Q 40/06 705/36 R |
| 2018/0285886 | A1 * | 10/2018 | Yan | G06Q 30/018 |
| 2021/0279731 | A1 * | 9/2021 | Agrawal | G06Q 20/322 |
| 2024/0378674 | A1 * | 11/2024 | Plehn-Dujowich | G06Q 40/06 |

OTHER PUBLICATIONS

Volume II : Edgar Filing Manual, Index of Forms (Year: 2025).*
Bose, et al. Detecting Insider Threats Using RADISH: A System for Real-Time Anomaly Detection in Heterogeneous Data Streams 11 IEEE Systems Journal 471 (2017). (Year: 2017).*

* cited by examiner

*Primary Examiner* — Charles Guiliano
*Assistant Examiner* — Theodore Xie
(74) *Attorney, Agent, or Firm* — Weiss & Arons LLP

(57) ABSTRACT

Systems and methods for alerting an organization about activity that may be fraudulent. Systems may include a computer processor, a storage module, a cleaning module, a preprocessing module, a features extraction module, and a machine learning module. The computer processor may be configured to run a fraud detection engine by collecting publicly available electronic forms every 36 hours, using the modules to store the forms, clean the data, preprocess the data, and run a machine learning model to extract features and to determine if a threshold indicating a risk of fraud has been exceeded. The machine learning models include a liquid, solvency, and profitability ratio classification model, a disclosure classification model, a sentiment analysis model, an anomaly detection classification model, an ownership analysis classification model, and an ESG disclosure classification model. When exceeding a threshold, the computer processor may notify an administrator of the exceeded threshold's identity.

13 Claims, 5 Drawing Sheets

AUTOMATION OF FRAUD DETECTION WITH MACHINE LEARNING UTILIZING PUBLICLY AVAILABLE FORMS

FIELD OF TECHNOLOGY

Aspects of the disclosure relate to detecting fraud. Specifically, aspects of the disclosure relate to using machine learning to detect fraud in publicly available forms.

BACKGROUND OF THE DISCLOSURE

In today's fast-moving world it may be difficult to identify fraudulent activities such as fraudulent activities in an organization. Fraudulent activities may even take place in public organizations such as public companies and still evade the public eye. Even when there is a suspicion of fraud, it may be difficult to raise a suggest fraudulent due to potentially weak evidence. A ramification of missing fraudulent activity may be an increase in front companies, shell companies, money laundering, among other problems. Another outcome of unresolved fraudulent activity may include an erosion of confidence in an economy which hosts suspected fraudulent culprits.

National organizations were established to serve as safeguards against fraud among public organizations. For example, in the United States, the Securities and Exchange Commission (SEC) has been established. The SEC requires public disclosures by organizations such as public companies. However, even with the presence of organizations such as the SEC, detecting fraud even in public companies continues to prove challenging. Part of the challenge may include identifying fraud that may be hidden in large volumes of publicly available documents submitted by companies to the SEC.

What is needed is an apparatus and method for identifying potential fraud among organizations such as public companies.

SUMMARY OF THE DISCLOSURE

Provided may be an apparatus and method for identifying potential fraud among organizations such as public companies. For example, provided may be an apparatus and method for sorting through a large volume of publicly available information about an organization such as a public company. The publicly available information may be accessible on a publicly available electronic portal.

Fraud detection apparatus and methods may include automation. Automation may save time and resources. Automation may eliminate or reduce manual processing of data. Automation may allow for focused manual processing of data. For example, manual processing may be used as a quality check for the automated process. Manual processing may be used for other parts of the fraud detection process. A computer processor running a machine learning model may automate the fraud detection apparatus and method.

Provided may be an apparatus, methods, and systems for alerting an organization about activity that may be fraudulent. Methods may include using a computer processor to collect forms submitted to an electronic portal of a Security and Exchange Commission (SEC), where the forms may be related to an organization. The organization may have submitted the forms. Another party may have submitted the forms. The one or more forms submitted to the electronic portal of the SEC comprise SEC Form 10-K, SEC Form 8-K, SEC Form 10-Q, SEC Form 4, and SEC Form SD.

Methods may include the computer processor collecting the forms every 45 days or less. The computer processor may collect the forms every 15 days or less. The computer processor may collect the forms every 8 days or less. The computer processor may collect the forms every 36 hours or less. The computer processor may collect the forms in real-time as they are provided on the electronic portal. Real-time may be 2 hours or less. Real-time may be 1 hour or less. Real-time may be 30 minutes or less. Real-time may be 15 minutes or less. Real-time may be 5 minutes or less.

Methods may include the computer processor cleaning and preprocessing data found in the forms to produce cleaned and preprocessed data.

Methods may include the computer processor running machine learning models to extract sets of features from the cleaned and preprocessed data.

For example, the sets of features may include a set of features relating to liquid, solvency, and profitability ratio classification. The sets of features may include a set of features relating to disclosure classification. The sets of features may include a set of features relating to sentiment analysis. The sets of features may include a set of features relating to anomaly detection classification. The sets of features may include a set of features relating to ownership analysis classification. The sets of features may include a set of features relating to environmental, social, and governance (ESG) disclosure classification.

Methods may include the computer processor running machine learning models to determine if a threshold has been exceeded indicating a risk of fraud.

The machine learning model may include a liquid, solvency, and profitability ratio classification machine learning model. The machine learning model may include a disclosure classification machine learning model. The machine learning model may include a sentiment analysis machine learning model. The machine learning model may include an anomaly detection classification machine learning model. The machine learning model may include an ownership analysis classification machine learning model. The machine learning model may include an ESG disclosure classification machine learning model.

Determining if a threshold has been exceeded may indicate a risk of fraud. Exceeding a threshold when running a liquid, solvency, and profitability ratio classification machine learning model may indicate a detection of one or more unusual liquid, solvency, and profitability ratios. Exceeding a threshold when running a disclosure classification machine learning model may indicate a detection of one or more ambiguous disclosures. Exceeding a threshold when running a sentiment analysis machine learning model to indicate a detection of market manipulation. Exceeding a threshold when running an anomaly detection classification machine learning model to indicate a detection of one or more anomalies. Exceeding a threshold when running an ownership analysis classification machine learning model may indicate a detection of one or more suspicious owners. Exceeding a threshold when running an ESG disclosure classification machine learning model may indicate a detection of one or more fraudulent disclosures are detected.

Methods may include a computer processor notifying an administrator in an organization when one or more thresholds have been exceeded. Methods may include a computer processor to notify an administrator in an organization when two or more thresholds have been exceeded. Methods may include a computer processor to notify an administrator in an organization when three or more thresholds have been exceeded. Methods may include a computer processor to notify an administrator in an organization when four or more thresholds have been exceeded. Methods may include a computer processor to notify an administrator in an organization when five or more thresholds have been exceeded. Methods may include a computer processor to notify an administrator in an organization when six or more thresholds have been exceeded. The organization may be the same organization as to which the forms are related. The organization may be an organization different than the organization as to which the forms are related.

Methods may include a computer processor informing the administrator in the organization with an identity of the threshold which has been exceeded.

Methods may include where the organization providing the forms and the organization determining if there is a risk of fraud are different organizations. Methods may include where the organization providing the forms and the organization determining if there is a risk of fraud are the same organization.

Methods may include collecting the forms from the electronic portal every 36 hours or less.

Methods may include applying a time series analysis to a machine learning model. Methods may include notifying an administrator in the second organization, using the computer processor, when an unusual temporal pattern has been detected.

Methods may include applying a clustering classification to one or more machine learning models. Methods may include the computer processor notifying an administrator in the organization when detecting an anomalous cluster.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
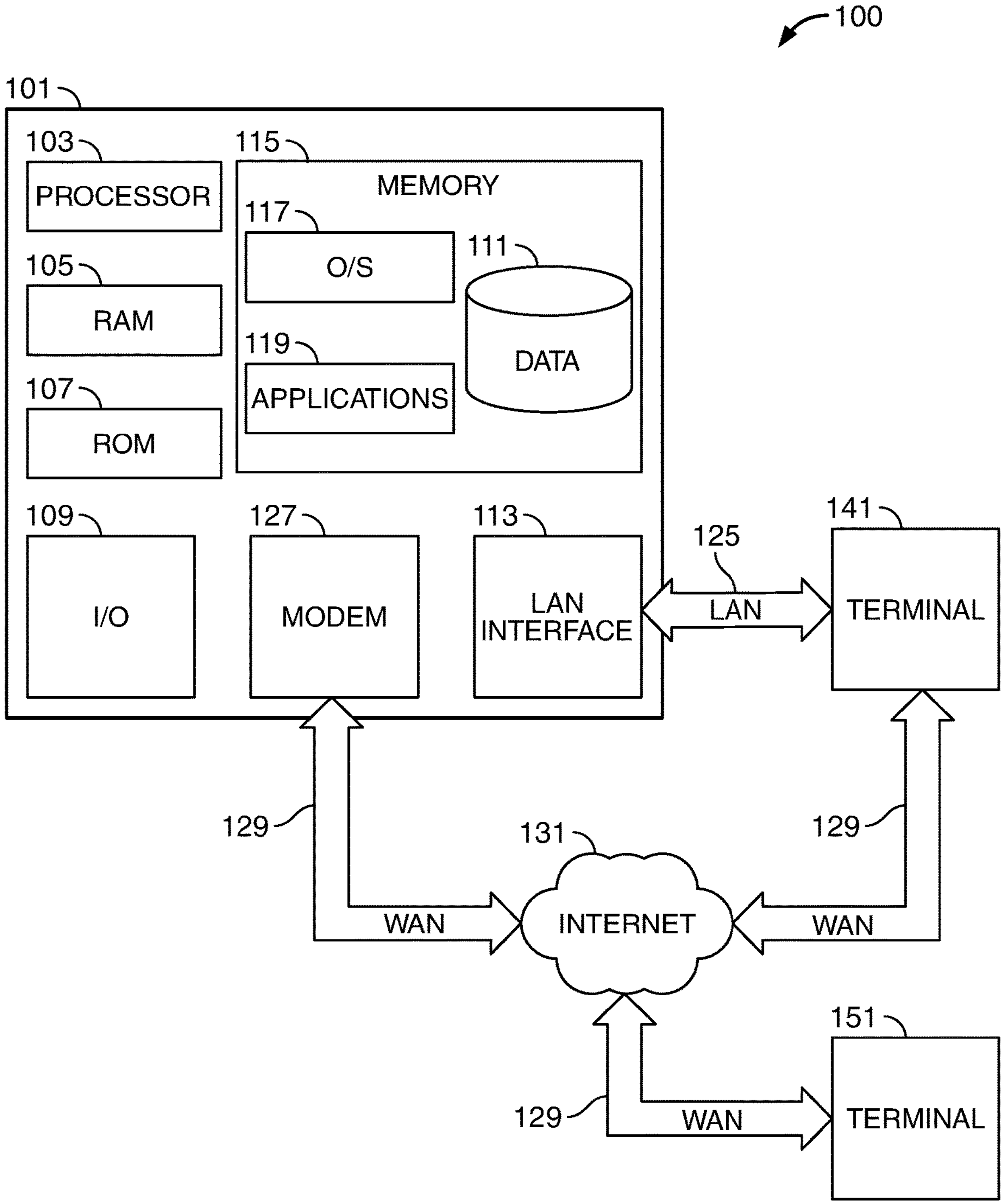
FIG. 1 shows an illustrative block diagram in accordance with principles of the disclosure.

Apparatus, methods, and systems for alerting an organization about activity that may be fraudulent are provided. Methods may include using a computer processor to collect forms submitted to an electronic portal. The forms may be publicly available. The forms may be related to an organization. The organization may have submitted the forms. Another party may have submitted the forms.

Methods may include the computer processor collecting the forms every 36 hours or less. The computer processor may collect the forms in real-time as they are provided on the electronic portal. Real-time may be 2 hours or less. Real-time may be 1 hour or less. Real-time may be 30 minutes or less. Real-time may be 15 minutes or less. Real-time may be 5 minutes or less.

Methods may include the computer processor cleaning and preprocessing the forms to produce cleaned and preprocessed data.

Methods may include the computer processor running machine learning models to extract sets of features from the cleaned and preprocessed data.

For example, the sets of features may include a set of features relating to liquid, solvency, and profitability ratio classification. The sets of features may include a set of features relating to disclosure classification. The sets of features may include a set of features relating to sentiment analysis. The sets of features may include a set of features relating to anomaly detection classification. The sets of features may include a set of features relating to ownership analysis classification. The sets of features may include a set of features relating to ESG disclosure classification.

Methods may include the computer processor to running machine learning models to determine if a threshold has been exceeded indicating a risk of fraud.

The machine learning model may include a liquid, solvency, and profitability ratio classification machine learning model. The machine learning model may include a disclosure classification machine learning model. The machine learning model may include a sentiment analysis machine learning model. The machine learning model may include an anomaly detection classification machine learning model. The machine learning model may include an ownership analysis classification machine learning model. The machine learning model may include an ESG disclosure classification machine learning model.

Determining if a threshold has been exceeded may indicate a risk of fraud. Exceeding a threshold when running a liquid, solvency, and profitability ratio classification machine learning model may indicate a detection of one or more unusual liquid, solvency, and profitability ratios. Exceeding a threshold when running a disclosure classification machine learning model may indicate a detection of one or more ambiguous disclosures Exceeding a threshold when running a sentiment analysis machine learning model to indicate a detection of market manipulation. Exceeding a threshold when running an anomaly detection classification machine learning model to indicate a detection of one or more anomalies. For example, an organization with no employees. Exceeding a threshold when running an ownership analysis classification machine learning model may indicate a detection of one or more suspicious owners. Exceeding a threshold when running an ESG disclosure classification machine learning model may indicate a detection of one or more fraudulent disclosures are detected.

A sentiment analysis machine learning model may use a library of terms that indicate negative, neutral, or positive sentiment. An example of a dictionary containing a library of terms related to sentiment is the Loughran-McDonald Master Dictionary with Sentiment Word Lists. Manipulation of sentiment may include where terms which indicate sentiment are used and those terms convey a sentiment different than the disclosed forms indicate should be conveyed.

The forms may include SEC Form 10-K. The forms may include SEC Form 8-K. The forms may include SEC Form 10-Q. The forms may include SEC Form 4. The forms may include SEC Form SD. The electronic portal may include a portal of the Security and Exchange Commission (SEC). The electronic portal may include the Electronic Data Gathering, Analysis, and Retrieval (EDGAR) database.

Methods may include a computer processor notifying an administrator in an organization when one or more thresholds have been exceeded. Methods may include a computer processor to notify an administrator in an organization when two or more thresholds have been exceeded. Methods may include a computer processor to notify an administrator in an organization when three or more thresholds have been exceeded Methods may include a computer processor to notify an administrator in an organization when four or more thresholds have been exceeded. Methods may include a computer processor to notify an administrator in an organization when five or more thresholds have been exceeded. Methods may include a computer processor to notify an administrator in an organization when six or more thresholds have been exceeded. The organization may be the same organization as to which the forms are related. The organization may be an organization different than the organization to which the forms are related.

Methods may include a computer processor informing the administrator in the organization with an identity of the threshold which has been exceeded.

Methods may include where the organization providing the forms and the organization determining if there is a risk of fraud are different organizations. Methods may include where the organization providing the forms and the organization determining if there is a risk of fraud are the same organization.

Methods may include applying a time series analysis to a machine learning model. Methods may include notifying an administrator in the second organization, using the computer processor, when an unusual temporal pattern has been detected.

Methods may include applying a clustering classification to one or more machine learning models. Methods may include the computer processor notifying an administrator in the organization when detecting an anomalous cluster.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. Processor 103 may also execute all software running on the computer. Other components commonly used for computers, such as EEPROM or Flash memory or any other suitable components, may also be part of the computer 101.

Memory 115 may be comprised of any suitable permanent storage technology—e.g., a hard drive. Memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). Computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform tasks or implement abstract data types. A computing system may be operational with distributed computing environments where tasks are performed by remote processing devices that are linked through a communications network. In a distributed computing environment, a program may be in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform tasks or implement particular data types. The invention may also be practiced in distributed computing environments where tasks are performed by remote processing devices that are linked through a communications network. In a distributed computing environment, programs may be in both local and remote computer storage media including memory storage devices. It should be noted that such programs may be considered for the purposes of this application as engines with respect to the performance of the tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, handheld or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
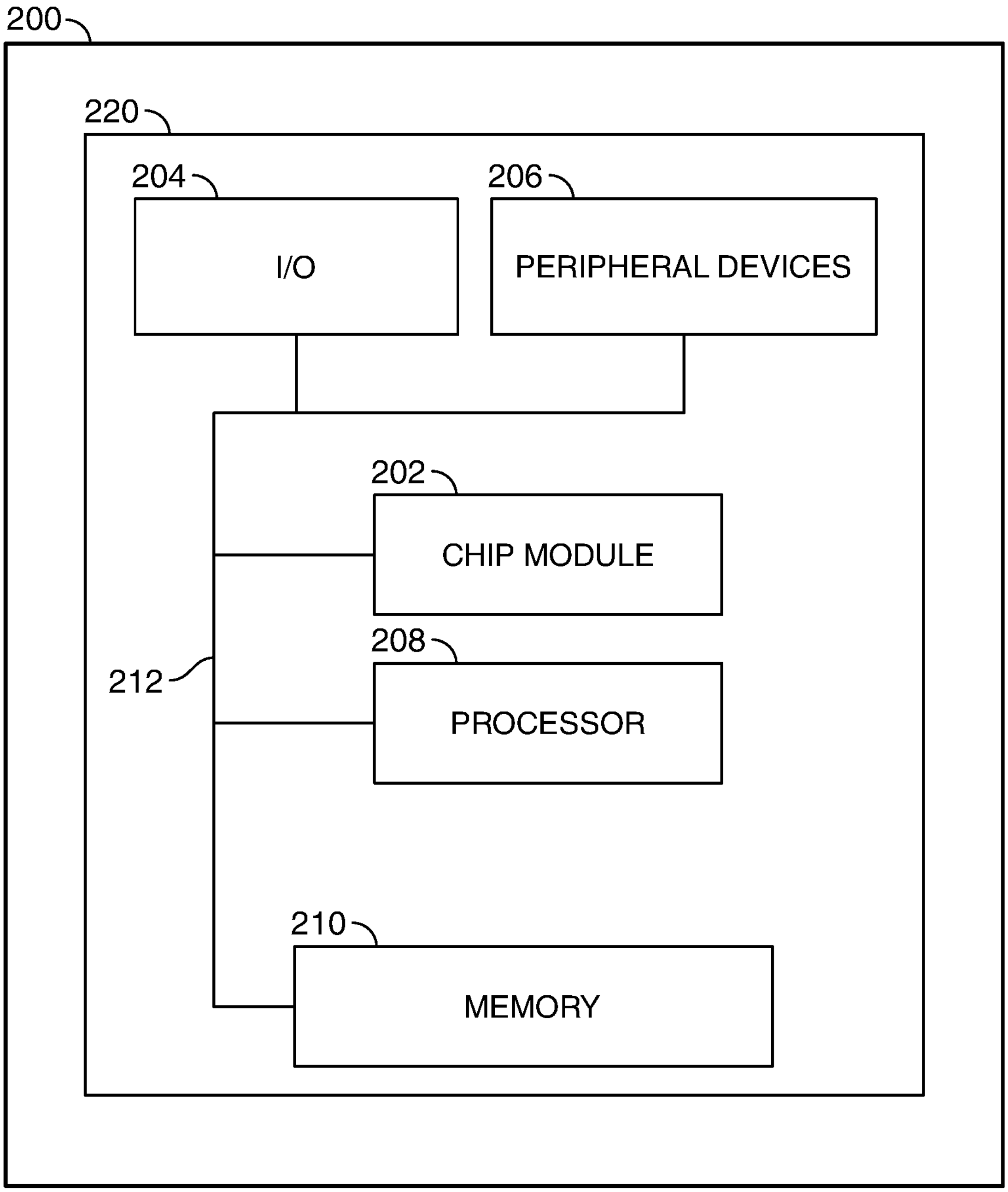
FIG. 2 shows an illustrative block diagram in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
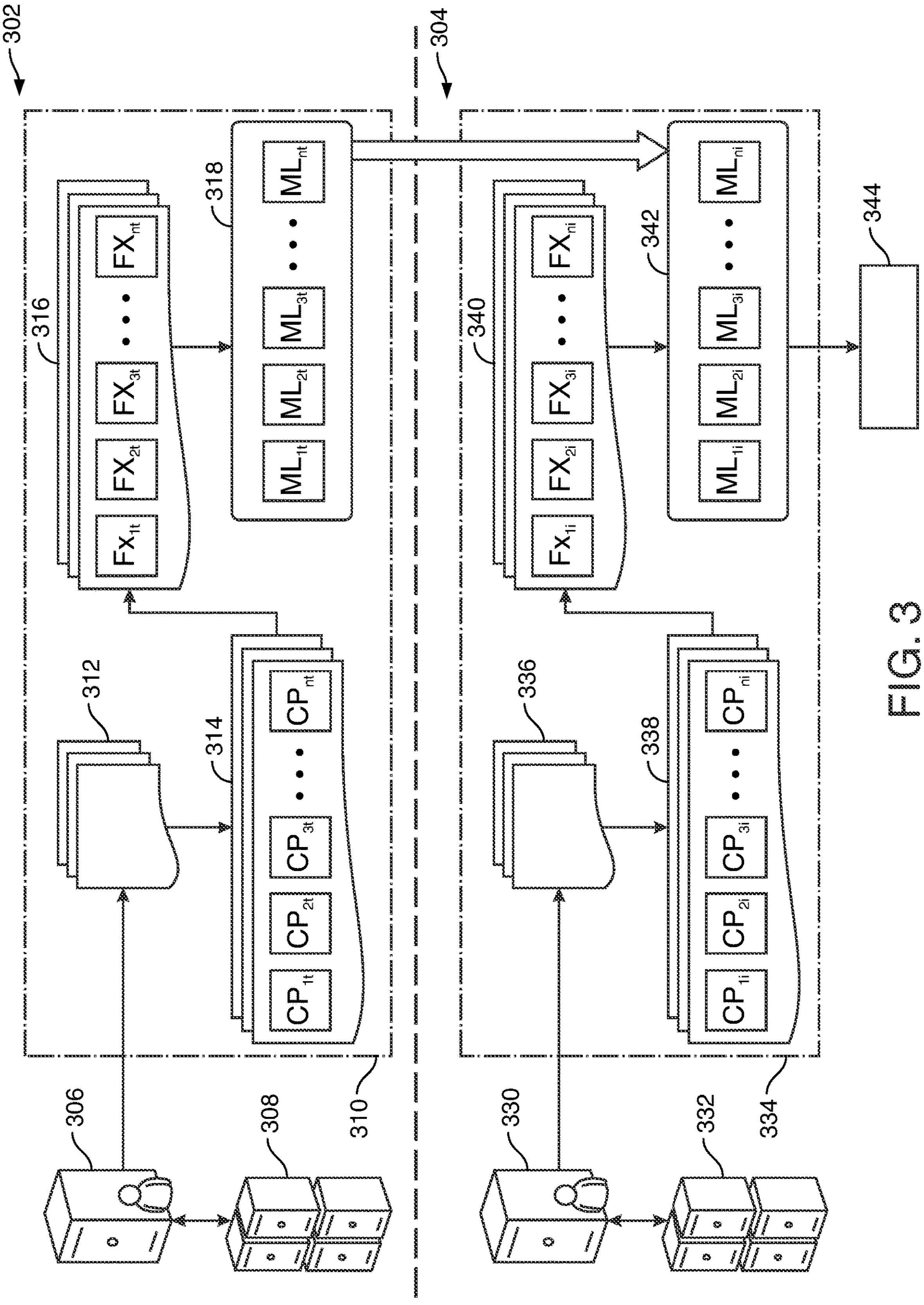
FIG. 3 shows an illustrative block diagram in accordance with principles of the disclosure.

FIG. 3 may show a flow diagram of a training stage 302 which may include training a fraud detection engine 310. FIG. 3 may show a flow diagram of an implementation stage 304 which may include implementing a fraud detection engine 334. In the training stage 302, computer processor 306 may communicate with electronic portal 308 to obtain forms. Electronic portal 308 may include a Securities and Exchange Commission (SEC) portal. Electronic portal 308 may include the Electronic Data Gathering, Analysis, and Retrieval (EDGAR) database. The forms may include electronic forms. The forms may include financial forms. The forms may include submissions by an organization to an SEC portal. The forms may include submissions by an organization to the EDGAR database. The forms may include SEC Form 10-K. The forms may include SEC Form 8-K. The forms may include SEC Form 10-Q. The forms may include SEC Form 4. The forms may include SEC Form SD.

Computer processor 306 may train fraud detection engine 310. Computer processor 306 may use the forms to train fraud detection engine 310. Computer processor 306 may store the forms at forms storage 312. Computer processor 306 may clean and preprocess the forms at model data 314. Model data 314 may include one set of cleaned and preprocessed data. Model data 314 may include multiple sets of cleaned and preprocessed data. For example, sets of cleaned and preprocessed model data 314 may include $CP_{1t}$, $CP_{2t}$, $CP_{3t}$, through $CP_{nt}$, referring to a first, second, third, and "n" set of cleaned and preprocessed model data. Examples of multiples sets of cleaned and preprocessed data may be found in Table 1.

TABLE 1

| Cleaned and preprocessed data.<br>Cleaned and Preprocessed Data |
|---|
| Data relating to liquid, solvency, and profitability ratio classification |
| Data relating to disclosure classification |
| Data relating to sentiment analysis |
| Data relating to anomaly detection classification |
| Data relating to ownership analysis classification |
| Data relating to Environmental, Social, and Governance (ESG) disclosure classification |
| Other suitable data |

Computer processor 306 may extract features from model data 314 to obtain feature extractions 316. Computer processor 306 may run a machine learning (ML) model to extract features from model data 314 to obtain feature extractions 316. For example, feature extractions 316 may include $FX_{1t}$, $FX_{2t}$, $FX_{3t}$, through $FX_{nt}$, referring to a first, second, third, and "n" set of feature extractions.

Feature extractions 316 may be used to train ML model 318. Fraud detection engine 310 may include fraud detection ML model 318. Extracting features may identify the most discriminating characteristics in the cleaned and processed forms, which a machine learning algorithm can more easily utilize.

Examples of feature extractions may be found in Table 2.

TABLE 2

| Feature extraction<br>Feature Extractions |
|---|
| Feature extraction relating to liquid, solvency, and profitability ratio classification |
| Feature extraction relating to disclosure classification |
| Feature extraction relating to sentiment analysis |
| Feature extraction relating to anomaly detection classification |
| Feature extraction relating to ownership analysis classification |
| Feature extraction relating to ESG disclosure classification |
| Other suitable feature extractions |

ML model 318 may include training a comprehensive ML model with various subunits performing specific tasks. ML model 318 may include training separate ML models with each ML model to perform a specific task. For example, ML model 318 may include $ML_{1t}$, $ML_{2t}$, $ML_{3t}$, through $ML_{nt}$, referring to a first, second, third, and "n" set of machine learning models. A computer processor may train ML model 318 to return a value that may be used to determine the presence of a fraud risk. Feature extractions 316 may be used to train ML model 318. For example, if a threshold set by the model is exceeded, the model may indicate the presence of a fraud risk. Examples of ML models and what the ML models may indicate regarding the risk of fraud may be found in Table 3.

TABLE 3

| ML models | |
|---|---|
| Name of ML Model | What potential fraud is indicated when the model returns a value that exceeds a threshold |
| Liquid, solvency, and profitability ratio classification ML model | An unusual liquid, solvency, and/or profitability ratio;<br>Other suitable indications of potential fraud |
| Disclosure classification ML model | An ambiguous disclosure;<br>A late disclosure;<br>Filing a supplemental disclosure with material that was not a part of the original disclosure, raising question regarding why not in original disclosure;<br>Other suitable indications of potential fraud |
| Sentiment analysis ML model | An attempt to manipulation a market;<br>Detect tone of the business language used and determine if it seeks to manipulating trading patterns in an unusual way;<br>Other suitable indications of potential fraud |
| Anomaly detection classification ML model | An anomaly;<br>Identify unusual patterns or behaviors in the financial data like i) no employees, and/or ii) no physical location;<br>Other suitable indications of potential fraud |
| Ownership analysis classification ML model | A suspicious owner;<br>Network analysis technique to identify relationship between companies and individuals that could suggest presence of front companies;<br>Other suitable indications of potential fraud |
| ESG disclosure classification ML model | A fraudulent disclosure;<br>Other suitable indications of potential fraud |
| Other suitable ML models | A suitable indications of potential fraud |

Types of ML models may include support vector machines. Types of ML models may include logistic regression. Types of ML models may include random forest. Types of ML models may include decision tree. Types of ML models may include classification models. Types of ML models may include clustering models. Types of ML models may include natural language processing models.

Multiple ML models may be run on a data set, for example to identify sets of features. Multiple ML models may be run on a data set, for example to predict when a threshold has been exceeded. The best ML model may be chosen from different models tried. The best ML model may mean that the ML model identifies sets of features with the most clarity of any ML models tried. The best ML model may mean that the ML model identifies when a threshold has been exceeded and thereby predicting potential fraud with the highest accuracy of any ML models tried.

Training ML model 318 may include training a liquid, solvency, and profitability ratio classification ML model to indicate an unusual liquid, solvency, and/or profitability ratio when an output value from the model exceeds a threshold. An unusual liquid, solvency, and/or profitability ratio may indicate fraud. For example, fraud may include misguiding the public to make incorrect conclusions about an organization's ability to operate well going into the future.

Training ML model 318 may include training a disclosure classification ML model to indicate an ambiguous disclosure when an output value from the model exceeds a threshold. An ambiguous disclosure may indicate fraud. For example, fraud may include performing fraudulent activity while describing those activities in vague, ambiguous terms and thereby evading scrutiny necessary to identify the fraud.

Training ML model 318 may include training a sentiment analysis ML model to indicate an attempt to manipulate a market when an output value from the model exceeds a threshold. An attempt to manipulate a market may indicate fraud. For example, fraud may include manipulating a market to shift the price of a stock of the organization. Manipulating a market may include manipulation of sentiment by using terms which indicate a sentiment which is different a sentiment different than the disclosed forms indicate should be conveyed.

Training ML model 318 may include training an anomaly detection classification ML model to indicate an anomaly when an output value from the model exceeds a threshold. An anomaly may indicate fraud. An anomaly may identify unusual patterns or behaviors in the organization. For example, unusual patterns or behaviors may include no employees. For example, unusual patterns or behaviors may include no physical location. The computer processor may use natural language processing (NLP) techniques to identify anomalies.

Training ML model 318 may include training an ownership analysis classification ML model to indicate a suspicious owner when an output value from the model exceeds a threshold. A suspicious owner may indicate fraud. For example, the fraud may include a front company and a shell company.

Training ML model 318 may include training an ESG disclosure classification ML model to indicate a fraudulent disclosure when an output value from the model exceeds a threshold. A fraudulent disclosure may indicate fraud. For example, the fraud may include a misleading disclosure about the organization's compliance with ESG regulations.

Computer processor 306 may train ML model 318 iteratively. For example, the trained fraud detection ML model 318 from above may be tested with a new extraction of forms from electronic portal 308. Computer processor 306 may store the forms at form storage 312. Computer processor 306 may clean and preprocess the forms at model data 314. Computer processor 306 may extract features from model data 314 to obtain feature extractions 316. Feature extractions 316 may be used to test and fine-tune ML model 318. Computer processor 306 may test ML model 318 with forms that contain examples which would exceed a threshold of ML model 318 and examples which would not exceed a threshold of ML model 318. Exceeding a threshold may indicate a possibility of fraud. Computer processor 306 may measure the accuracy of predictions by ML model 318. When ML model 318 predicts the presence of fraud and the absence of fraud with an accuracy that meets an accuracy threshold, then computer processor 306 may determine that ML model 318 is ready to move past training stage 302 and move to implementation stage 304. ML model 318 may be included in ML model 342.

Implementation state 304 may include a computer processor 330 communicating with electronic portal 332 to obtain forms. Electronic portal 332 may include a Securities and Exchange Commission (SEC) portal. Electronic portal 332 may include the Electronic Data Gathering, Analysis, and Retrieval (EDGAR) database. The forms may include electronic forms. The forms may include financial forms. The forms may include submissions by an organization to an SEC portal. The forms may include submissions by an organization to the EDGAR database. The forms may include SEC Form 10-K. The forms may include SEC Form 8-K. The forms may include SEC Form 10-Q. The forms may include SEC Form 4. The forms may include SEC Form SD.

Computer processor 330 may include computer processor 306. Computer processor 330 may be a computer processor that does not include computer processor 306. Electronic portal 332 may include electronic portal 308. Electronic portal 332 may be an electronic portal that does not include SEC portal 308.

Computer processor 330 may communicate with electronic portal 332 to obtain forms. Computer processor 330 may implement fraud detection engine 334. Computer processor 330 may run fraud detection engine 334 by using the forms found at forms storage 336. Computer processor 330 may clean and process the forms at model data 338. For example, sets of cleaned and preprocessed model data 338 may include $CP_{1i}$, $CP_{2i}$, $CP_{3i}$, through $CP_{ni}$, referring to a first, second, third, and "n" set of cleaned and preprocessed model data. Examples of multiples sets of cleaned and preprocessed data may be found in Table 1.

Computer processor 330 may extract features from model data 338 to obtain feature extractions 340. For example, feature extractions 340 may include $FX_{1i}$, $FX_{2i}$, $FX_{3i}$, through $FX_{ni}$, referring to a first, second, third, and "n" set of feature extractions. Computer processor 330 may run a ML model to extract features from model data 338 to obtain feature extractions 340.

Feature extractions 340 may be used to implement ML model 342. Fraud detection engine 334 may include fraud detection ML model 342. Extracting features may identify the most discriminating characteristics in the cleaned and processed forms, which a machine learning algorithm can more easily utilize. Examples of feature extractions may be found in Table 2.

ML model 342 may include implementing a comprehensive ML model with various subunits performing specific tasks. ML model 342 may include implementing separate ML models with each ML model to perform a specific task. For example, ML model 342 may include $ML_{1i}$, $ML_{2i}$, $ML_{3i}$, through $ML_{ni}$, referring to a first, second, third, and "n" set of machine learning models. A computer processor may implement ML model 342 to return a value used to determine the presence of a fraud risk. The computer processor may implement ML model 342 using feature extractions 340 to return a value that may be used to determine the presence of a fraud risk. For example, when a threshold set by the model is exceeded, the model may indicate the presence of a fraud risk. ML model 342 may include ML model 318. ML model 318 may have been trained in training stage 302. Examples of ML models and what the ML models may indicate regarding the risk of fraud may be found in Table 3.

ML model 342 may include a liquid, solvency, and profitability ratio classification ML model, which may indicate an unusual liquid, solvency, and/or profitability ratio when an output value from the model exceeds a threshold. An unusual liquid, solvency, and/or profitability ratio may indicate fraud. For example, fraud may include misguiding the public to make incorrect conclusions about an organization's ability to operate well going into the future.

ML model 342 may include a disclosure classification ML model, which may indicate an ambiguous disclosure when an output value from the model exceeds a threshold. An ambiguous disclosure may indicate fraud. An ambiguous disclosure may indicate fraud. For example, fraud may include performing fraudulent activity while describing those activities in vague, ambiguous terms and thereby evading scrutiny necessary to identify the fraud.

ML model 342 may include a sentiment analysis ML model, which may indicate an attempt to manipulate a market when an output value from the model exceeds a threshold. An attempt to manipulate a market may indicate fraud. For example, fraud may include manipulating a market to shift the price of a stock of the organization.

Manipulating a market may include changing public sentiment by altering how an organization is messaging information. The organization may message it information is a way that deviates from historical patterns to manipulate public sentiment about the organization. The altered sentiment may affect trading patterns with the organization's stock.

ML model 342 may include an anomaly detection classification ML model, which may indicate an anomaly when an output value from the model exceeds a threshold. An anomaly may indicate fraud. For example, the fraud may include something unusual about the organization such as no employees or no physical location.

ML model 342 may include an ownership analysis classification ML model, which may indicate a suspicious owner when an output value from the model exceeds a threshold. A suspicious owner may indicate fraud. For example, the fraud may include a front company and a shell company.

ML model 342 may include an ESG disclosure classification ML model, which may indicate a fraudulent disclosure when an output value from the model exceeds a threshold. A fraudulent disclosure may indicate fraud. For example, the fraud may include a misleading disclosure about the organization's compliance with ESG regulations.

When computer processor 330 detects a presence of risk of fraud, action 344 may be taken. Action 344 may include preparing a report. Action 344 may include preparing a report and sending it to the organization. Action 344 may include preparing a report and sending it to an administrator in the organization.

Figure 4:
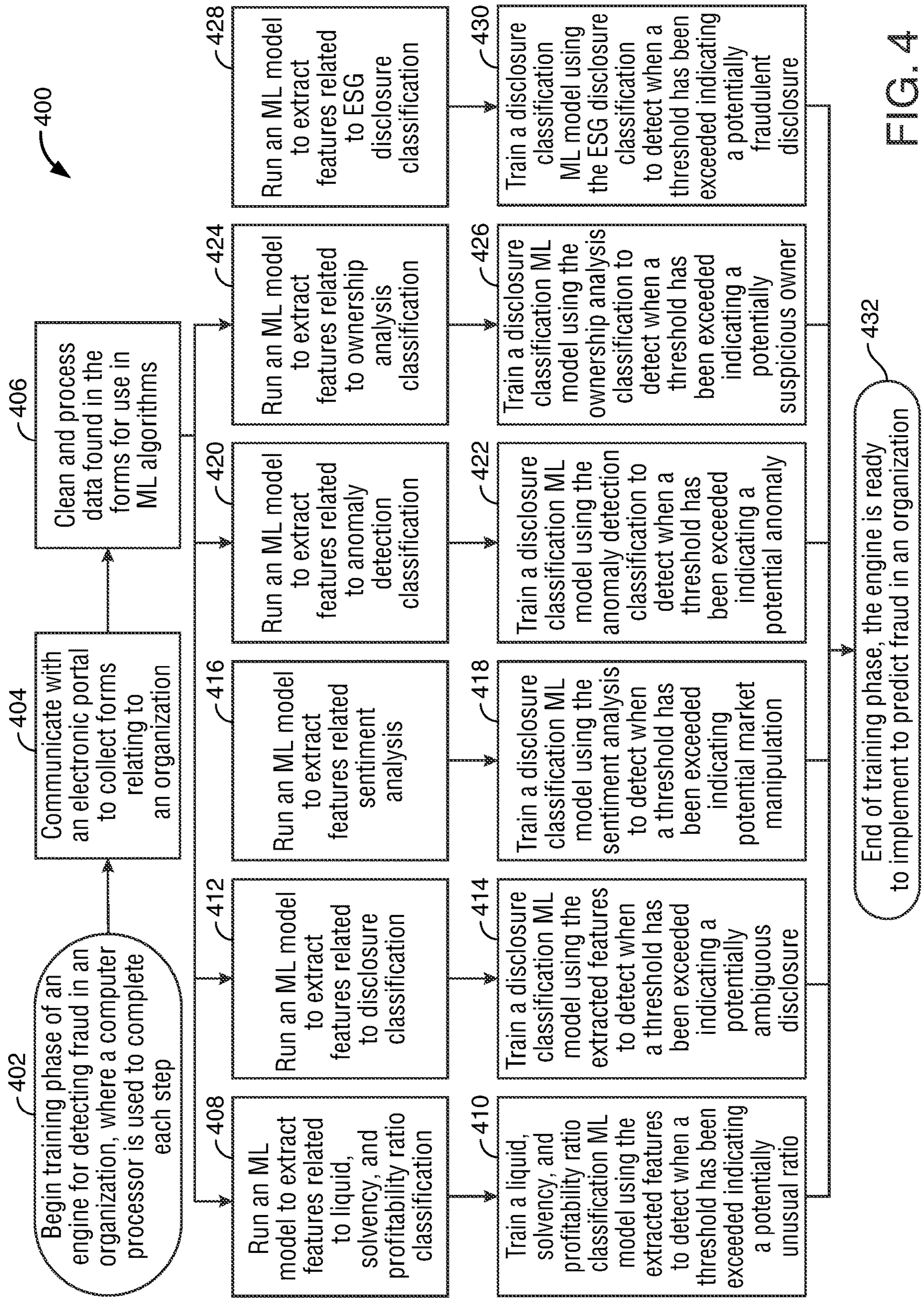
FIG. 4 shows an illustrative flowchart in accordance with principles of the disclosure.

FIG. 4 may show an illustrative flowchart 400 for training a fraud prediction machine learning (ML) model. The training phase of an engine for detecting fraud in an organization may begin at step 402. At step 404, a computer processor may communicate with an electronic portal to collect forms which are publicly available. At step 406, the computer processor may clean and process the forms to prepare them for use in an ML algorithm. The computer processor may run an ML model to extract features.

At step 408, the computer processor may run an ML model to extract features from the cleaned and processed form where the extracted features relate to liquid, solvency, and profitability ratio classification. At step 410, using the extracted features, the computer processor may train a liquid, solvency, and profitability ratio classification ML model to detect when a threshold has been exceeded. Exceeding a threshold may indicate a potentially unusual ratio. Exceeding a threshold may include other suitable indications of potential fraud.

At step 412, the computer processor may run an ML model to extract features from the cleaned and processed form where the extracted features relate to disclosure classification. At step 414, using the extracted features, the computer processor may train a disclosure classification ML model to detect when a threshold has been exceeded. Exceeding a threshold may indicate a potentially ambiguous disclosure. Exceeding a threshold may include other suitable indications of potential fraud.

At step 416, the computer processor may run an ML model to extract features from the cleaned and processed form where the extracted features relate to sentiment analysis. At step 418, using the extracted features, the computer processor may train a sentiment analysis ML model to detect when a threshold has been exceeded. Exceeding a threshold may indicate a potential attempt by the organization to manipulate a market to shift the price of a stock of the organization. Exceeding a threshold may include other suitable indications of potential fraud.

At step 420, the computer processor may run an ML model to extract features from the cleaned and processed form where the extracted features relate to anomaly detection classification. At step 422, using the extracted features, the computer processor may train an anomaly detection classification ML model to detect when a threshold has been exceeded. Exceeding a threshold may indicate a potential anomaly. Exceeding a threshold may include other suitable indications of potential fraud.

At step 424, the computer processor may run an ML model to extract features from the cleaned and processed form where the extracted features relate to ownership analysis classification. At step 426, using the extracted features, the computer processor may train an ownership analysis classification ML model to detect when a threshold has been exceeded. Exceeding a threshold may indicate a potentially suspicious owner. Exceeding a threshold may include other suitable indications of potential fraud.

At step 428, the computer processor may run an ML model to extract features from the cleaned and processed form where the extracted features relate to ESG disclosure classification. At step 430, using the extracted features, the computer processor may train an ESG disclosure classification ML model to detect when a threshold has been exceeded. Exceeding a threshold may indicate a potentially fraudulent disclosure. Exceeding a threshold may include other suitable indications of potential fraud.

Step 432 may be the end of the training phase. At step 432, the computer processor may provide a trained engine for implementation in detecting fraud in an organization.

Figure 5:
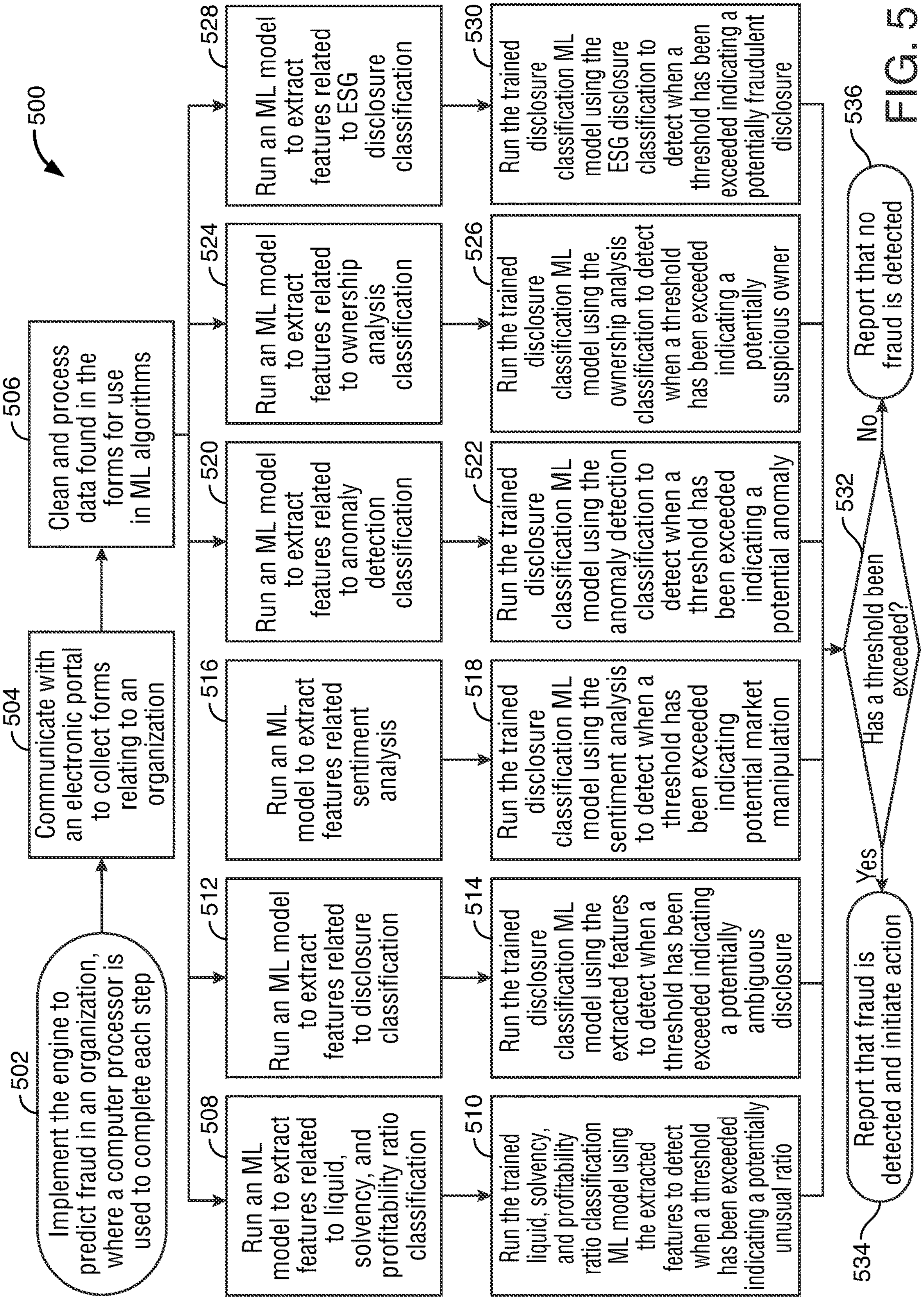
FIG. 5 shows an illustrative flowchart in accordance with principles of the disclosure.

FIG. 5 may show an illustrative flowchart 500 for implementing a fraud prediction ML model. The implementation phase of an engine for detecting fraud in an organization may begin at step 502. At step 504, a computer processor may communicate with an electronic portal to collect forms related to an organization. At step 506, the computer processor may clean and process the forms to prepare them for use in an ML algorithm. The computer processor may run an ML model to extract features.

At step 508, the computer processor may run an ML model to extract features from the cleaned and processed form where the extracted features relate to liquid, solvency, and profitability ratio classification. At step 510, using the extracted features, the computer processor may run a liquid, solvency, and profitability ratio classification ML model to detect when a threshold has been exceeded. The ML model may be the liquid, solvency, and profitability ratio classification ML model trained at step 410 in FIG. 4. Exceeding a threshold may indicate a potentially unusual ratio. Exceeding a threshold may include other suitable indications of potential fraud.

At step 512, the computer processor may run an ML model to extract features from the cleaned and processed form where the extracted features relate to disclosure classification. At step 514, using the extracted features, the computer processor may run a disclosure classification ML model to detect when a threshold has been exceeded. The ML model may be the disclosure classification ML model trained at step 414 in FIG. 4. Exceeding a threshold may indicate a potentially ambiguous disclosure. Exceeding a threshold may include other suitable indications of potential fraud.

At step 516, the computer processor may run an ML model to extract features from the cleaned and processed form where the extracted features relate to sentiment analysis. At step 518, using the extracted features, the computer processor may run a sentiment analysis ML model to detect when a threshold has been exceeded. The ML model may be the sentiment analysis ML model trained at step 418 in FIG. 4. Exceeding a threshold may indicate a potential attempt by the organization to manipulate a market to shift the price of a stock of the organization. Exceeding a threshold may include other suitable indications of potential fraud.

At step 520, the computer processor may run an ML model to extract features from the cleaned and processed form where the extracted features relate to anomaly detection classification. At step 522, using the extracted features, the computer processor may run an anomaly detection classification ML model to detect when a threshold has been exceeded. The ML model may be the anomaly detection classification ML model trained at step 422 in FIG. 4. Exceeding a threshold may indicate a potential anomaly. Exceeding a threshold may include other suitable indications of potential fraud.

At step 524, the computer processor may run an ML model to extract features from the cleaned and processed form where the extracted features relate to ownership analysis classification. At step 526, using the extracted features, the computer processor may run an ownership analysis classification ML model to detect when a threshold has been exceeded. The ML model may be the ownership analysis classification ML model trained at step 426 in FIG. 4. Exceeding a threshold may indicate a potentially suspicious owner. Exceeding a threshold may include other suitable indications of potential fraud.

At step 528, the computer processor may run an ML model to extract features from the cleaned and processed form where the extracted features relate to ESG disclosure classification. At step 530, using the extracted features, the computer processor may run an ESG disclosure classification ML model to detect when a threshold has been exceeded. The ML model may be the ESG disclosure classification ML model trained at step 430 in FIG. 4. Exceeding a threshold may indicate a potentially fraudulent disclosure Exceeding a threshold may include other suitable indications of potential fraud.

At step 532, a computer processor may determine if a threshold has been exceeded. If a threshold has been exceeded, at step 534 the computer may present a report to the organization that a threshold has been exceeded. The computer may present a report to an administrator in the organization that a threshold has been exceeded. The organization may be the same organization as the organization where the exceeded threshold was found. The organization may be a different organization to the organization where the exceeded threshold was found. The organization may be an organization determining whether to provide funds to the organization who provided the forms which caused the threshold to be exceeded.

If a threshold has not been exceeded, at step 536 the computer processor may provide the organization with a report that no thresholds have been exceeded.

Thus, systems and methods for alerting an organization about potential fraud are provided. Systems and methods for using a machine learning model to assess forms available online to identify potential fraud and alert an organization are provided. Persons skilled in the art will appreciate that the present invention can be practiced by other than the described embodiments, which are presented for purposes of illustration rather than of limitation. The present invention is limited only by the claims that follow.

What is claimed is:

1. A method for optimizing use of a computer processor to perform fraud detection, said method comprises automating detection of fraud by using the computer processor to eliminate manual processing of data in analysis of publicly available information about a public corporation or alerting an organization about activity that may be fraudulent, the method comprising:

collecting automatically every 36 hours or less, using a computer processor, one or more forms which are publicly available relating to the organization from an electronic portal;

wherein the one or more forms comprise SEC Form 10-K, SEC Form 8-K, SEC Form 10-Q, SEC Form 4, and SEC Form SD;

cleaning and preprocessing automatically, using the computer processor, data found in the one or more forms to produce cleaned and preprocessed data;

extracting automatically, using the computer processor to run one or more machine learning models, two or more sets of features from cleaned and preprocessed data;

wherein:

the one or more machine learning models comprise a first set of machine learning models;

said first set of machine learning models comprise natural language processing models;

said first set of machine learning models comprise support vector machines;

the two or more sets of features comprise a set of features related to liquid, solvency, and profitability ratio classification, a set of features related to disclosure classification, a set of features related to sentiment analysis, a set of features related to anomaly detection classification, a set of features related to ownership analysis classification, and a set of features related to ESG disclosure classification;

determining automatically, using the computer processor to run two or more machine learning models from a second set of machine learning models, if two or more thresholds have been exceeded indicating a risk of fraud;

wherein:

the second set of machine learning models comprise: a liquid, solvency, and profitability ratio classification machine learning model, a disclosure classification machine learning model, a sentiment analysis machine learning model, an anomaly detection classification machine learning model, an ownership analysis classification machine learning model, and an ESG disclosure classification machine learning model;

the liquid, solvency, and profitability ratio classification machine learning model, the disclosure classification machine learning model, the sentiment analysis machine learning model, the anomaly detection classification machine learning model, the ownership analysis classification machine learning model, and the ESG disclosure classification machine learning model comprise support vector machines;

the sentiment analysis machine learning model uses a Loughran-McDonald Master Dictionary with Sentiment Word Lists to identify negative, neutral, or positive sentiment;

the anomaly detection classification machine learning model uses natural language processing techniques to identify anomalies; and the second set of machine learning models operate in a training stage and an implementation stage;

notifying automatically an administrator, using the computer processor, when two or more thresholds have been exceeded;

informing automatically the administrator, using the computer processor, with an identity of the two or more thresholds which have been exceeded;

training the second set of machine learning models iteratively by in the machine learning models with training stage by collecting one or more second set of forms from the electronic portal;

extracting features from the one or more second set of forms using the first set of machine learning models;

testing the second set of machine learning models with forms that contain examples which would exceed a threshold of the second set of machine learning models and examples which would not exceed a threshold of the second set of machine learning models; and fine-tuning the second set of machine learning models based on testing results; and determining that the second set of machine learning models are ready to move from the training stage to the implementation stage when the second set of machine learning models predict a presence of fraud and an absence of fraud with an accuracy that meets an accuracy threshold;

wherein the computer processor automates detection of fraud and eliminates manual processing of data in the analysis of publicly available information about a public corporation.

2. The method of claim 1, wherein:

exceeding a threshold when running a liquid, solvency, and profitability ratio classification machine learning model indicates where the liquid, solvency, and profitability ratio classification misguides a public to make incorrect conclusions about an ability of an organization to operate;

exceeding a threshold when running a disclosure classification machine learning model indicates a detection of one or more ambiguous disclosures;

exceeding a threshold when running a sentiment analysis machine learning model indicates a detection of one or more erroneous statements about the organization;

exceeding a threshold when running an anomaly detection classification machine learning model indicates a detection of one or more anomalies;

exceeding a threshold when running an ownership analysis classification machine learning model indicates a detection of one or more suspicious owners; and exceeding a threshold when running an ESG disclosure classification machine learning model indicates a detection of one or more fraudulent ESG disclosures are detected.

3. The method of claim 1, wherein the administrator is part of the organization.

4. The method of claim 1, wherein:

the organization is a first organization; and the administrator is part of a second organization.

5. The method of claim 1, wherein the electronic portal is a portal of a Securities and Exchange Commission (SEC).

6. The method of claim 5, wherein the one or more forms comprise SEC Form 10-K, SEC Form 8-K, SEC Form 10-Q, SEC Form 4, and SEC Form SD.

7. The method of claim 1, wherein the electronic portal is an Electronic Data Gathering, Analysis, and Retrieval (EDGAR) database.

8. A method for optimizing use of a computer processor to perform fraud detection, said method comprises automating detection of fraud by using the computer processor to eliminate manual processing of data in analysis of publicly available information about a public corporation or alerting an organization about activity that may be fraudulent, the method comprising:

collecting automatically every 45 days or less from an electronic portal of a Security and Exchange Commission (SEC), using a computer processor, one or more forms submitted to the SEC relating to a first organization;

wherein the one or more forms submitted to the SEC comprise SEC Form 10-K, SEC Form 8-K, SEC Form 10-Q, SEC Form 4, and SEC Form SD;

cleaning and preprocessing automatically, using the computer processor, data found in the one or more forms to produce cleaned and preprocessed data;

extracting automatically, using the computer processor to run one or more machine learning models, two or more sets of features from cleaned and preprocessed data;

wherein:

the one or more machine learning models comprise a first set of machine learning models;

said first set of machine learning models comprise natural language processing models:

said first set of machine learning models comprise support vector machines;

the two or more sets of features comprise a set of features related to liquid, solvency, and profitability ratio classification, a set of features related to disclosure classification, a set of features related to sentiment analysis, a set of features related to anomaly detection classification, a set of features related to ownership analysis classification, and a set of features related to ESG disclosure classification;

determining automatically, using the computer processor to run two or more machine learning models from a second set of machine learning models, if two or more thresholds have been exceeded indicating a risk of fraud;

wherein:

the second set of machine learning models comprise a liquid, solvency, and profitability ratio classification machine learning model, a disclosure classification machine learning model, a sentiment analysis machine learning model, an anomaly detection classification machine learning model, an ownership analysis classification machine learning model, and an ESG disclosure classification machine learning model;

the liquid, solvency, and profitability ratio classification machine learning model, the disclosure classification machine learning model, the sentiment analysis machine learning model, the anomaly detection classification machine learning model, the ownership analysis classification machine learning model, and the ESG disclosure classification machine learning model comprise support vector machines;

the sentiment analysis machine learning model uses a Loughran-McDonald Master Dictionary with Sentiment Word Lists to identify negative, neutral, or positive sentiment;

the anomaly detection classification machine learning model uses natural language processing techniques to identify anomalies; and wherein the second set of machine learning models operate in a training stage and an implementation stage;

notifying automatically an administrator in a second organization, using the computer processor, when two or more thresholds have been exceeded; and informing automatically the administrator, using the computer processor, with an identity of the two or more thresholds which have been exceeded;

training the second set of machine learning models iteratively in the training stage by collecting one or more second set of forms from the electronic portal;

extracting features from the one or more second set of forms using the first set of machine learning models;

testing the second set of machine learning models with forms that contain examples which would exceed a threshold of the second set of machine learning models and examples which would not exceed a threshold of the second set of machine learning models; and fine-tuning the second set of machine learning models based on testing results;

determining that the second set of machine learning models are ready to move from the training stage to the implementation stage when the second set of machine learning models predict a presence of fraud and an absence of fraud with an accuracy that meets an accuracy threshold;

wherein the computer processor automates detection of fraud and eliminates manual processing of data in the analysis of publicly available information about a public corporation.

9. The method of claim 8, wherein:

exceeding a threshold when running a liquid, solvency, and profitability ratio classification machine learning model indicates where the liquid, solvency, and profitability ratio classification misguides a public to make incorrect conclusions about an ability of an organization to operate;

exceeding a threshold when running a disclosure classification machine learning model indicates a detection of one or more ambiguous disclosures;

exceeding a threshold when running a sentiment analysis machine learning model indicates a detection of one or more erroneous statements about the organization;

exceeding a threshold when running an anomaly detection classification machine learning model indicates a detection of one or more anomalies;

exceeding a threshold when running an ownership analysis classification machine learning model indicates a detection of one or more suspicious owners; and exceeding a threshold when running an ESG disclosure classification machine learning model indicates a detection of one or more fraudulent ESG disclosures are detected.

10. The method of claim 8, wherein collecting automatically the one or more forms from the electronic portal occurs every 36 hours or less.

11. The method of claim 8, wherein the first organization and the second organization are different organizations.

12. A system for optimizing use of a computer processor to perform fraud detection, said system comprises automating detection of fraud by using the computer processor to eliminate manual processing of data in analysis of publicly available information about a public corporation or alerting an organization about activity that may be fraudulent, the system comprising:

a computer processor;

a fraud detection engine comprising:

a storage module;

a cleaning module;

a preprocessing module;

a features extraction module;

a machine learning module;

wherein the computer processor is configured to run the fraud detection engine by performing steps comprising:

collect automatically every 36 hours or less one or more forms submitted to a Security and Exchange Commission (SEC) relating to a first organization from an electronic portal of the SEC;

wherein the one or more forms submitted to the SEC comprise SEC Form 10-K, SEC Form 8-K, SEC Form 10-Q, SEC Form 4, and SEC Form SD;

store automatically the one or more forms in the storage module;

clean data automatically with the cleaning module using the one or more forms found in the storage module;

preprocess data automatically with the preprocessing module using cleaned data from the cleaning module;

extract automatically, using one or more machine learning models, two or more sets of features with the features extraction module using preprocessed data from the preprocessing module;

wherein:

the one or more machine learning models comprise a first set of machine learning models;

said first set of machine learning models comprise natural language processing models:

said first set of machine learning models comprise support vector machines;

the two or more sets of features comprise a set of features related to liquid, solvency, and profitability ratio classification, a set of features related to disclosure classification, a set of features related to sentiment analysis, a set of features related to anomaly detection classification, a set of features related to ownership analysis classification, and a set of features related to ESG disclosure classification;

determine automatically from a second set of machine learning models if two or more thresholds indicating a risk of fraud are exceeded by using two or more machine learning models to analyze features from the features extraction module;

wherein:

the second set of machine learning models comprise; a liquid, solvency, and profitability ratio classification machine learning model, a disclosure classification machine learning model, a sentiment analysis machine learning model, an anomaly detection classification machine learning model, an ownership analysis classification machine learning model, and an ESG disclosure classification machine learning model;

the liquid, solvency, and profitability ratio classification machine learning model, the disclosure classification machine learning model, the sentiment analysis machine learning model, the anomaly detection classification machine learning model, the ownership analysis classification machine learning model, and the ESG disclosure classification machine learning model comprise support vector machines;

the sentiment analysis machine learning model uses a Loughran-McDonald Master Dictionary with Sentiment Word Lists to identify negative, neutral, or positive sentiment;

the anomaly detection classification machine learning model uses natural language processing techniques to identify anomalies; and wherein the second set of machine learning models operate in a training stage and an implementation stage;

notify automatically an administrator in a second organization, using the computer processor, when two or more thresholds have been exceeded; and inform automatically the administrator, using the computer processor, with an identity of the two or more thresholds which have been exceeded;

train the second set of machine learning models iteratively in the training stage by collecting one or more second set of forms from the electronic portal and extract features from the one or more second set of forms using the first set of machine learning models;

test the second set of machine learning models with forms that contain examples which would exceed a threshold of the second set of machine learning models and examples which would not exceed a threshold of the second set of machine learning models;

fine-tune the second set of machine learning models based on testing results; and determine that the second set of machine learning models are ready to move from the training stage to the implementation stage when the second set of machine learning models predict a presence of fraud and an absence of fraud with an accuracy that meets an accuracy threshold;

wherein the computer processor automates detection of fraud and eliminates manual processing of data in the analysis of publicly available information about a public corporation.

13. The system of claim 12, wherein:

exceeding a threshold when running a liquid, solvency, and profitability ratio classification machine learning model indicates where the liquid, solvency, and profitability ratio classification misguides a public to make incorrect conclusions about an ability of an organization to operate;

exceeding a threshold when running a disclosure classification machine learning model indicates a detection of one or more ambiguous disclosures;

exceeding a threshold when running a sentiment analysis machine learning model indicates a detection of one or more erroneous statements about the organization;

exceeding a threshold when running an anomaly detection classification machine learning model indicates a detection of one or more anomalies;

exceeding a threshold when running an ownership analysis classification machine learning model indicates a detection of one or more suspicious owners; and exceeding a threshold when running an ESG disclosure classification machine learning model indicates a detection of one or more fraudulent ESG disclosures are detected.

* * * * *